D. A. SIMS & W. M. BROWN.
CATTLE GUARD.
APPLICATION FILED JUNE 26, 1908.
918,478.
Patented Apr. 13, 1909.
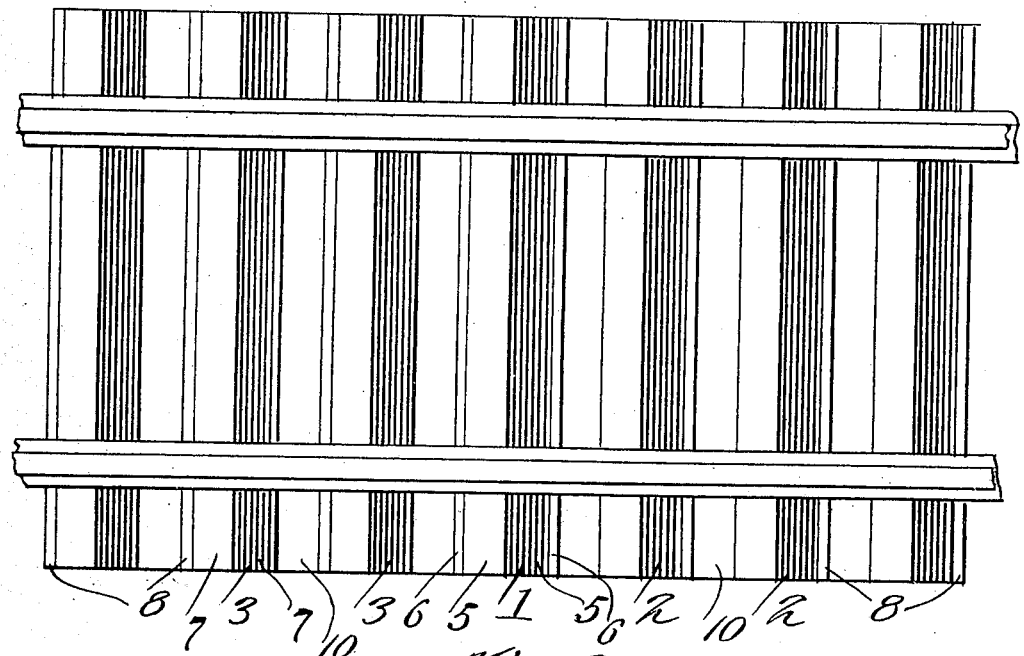
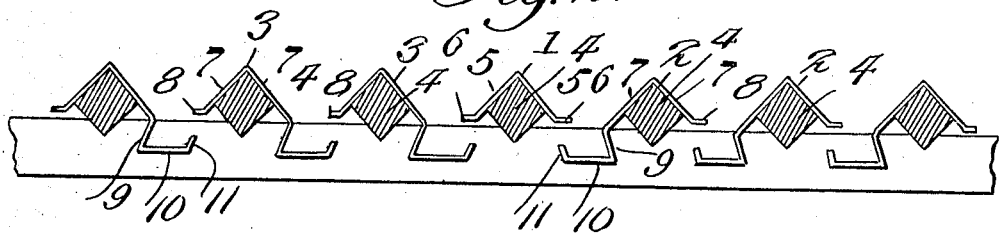
Witnesses
Addison P. Smith
D. W. Gould.
Inventors
David A. Sims
Walter M. Brown
By Victor J. Evans
Attorney

UNITED STATES PATENT OFFICE.

DAVID A. SIMS AND WALTER M. BROWN, OF FORT SMITH, ARKANSAS.

CATTLE-GUARD.

No. 918,478.     Specification of Letters Patent.    Patented April 13, 1909.

Application filed June 26, 1908. Serial No. 440,597.

*To all whom it may concern:*

Be it known that we, DAVID A. SIMS and WALTER M. BROWN, citizens of the United States, residing at Fort Smith, in the county of Sebastian and State of Arkansas, have invented new and useful improvements in Cattle-Guards, of which the following is a specification.

The invention relates to an improvement in cattle guards, being particularly directed to a construction in which the foot of the animal will be received in a depending conduit, the parts being formed to prevent the animal lifting its foot for a step in advance without interfering with the withdrawal of the foot for a backward step.

The main object of the present invention is the provision of a cattle guard including a conduit to receive the foot of the animal having its rear wall so projected as to provide an over-hang to engage the heel of the animal in the bending of the knee incident to a step forward, and prevent the lifting of the foot, the opposing portion of the adjacent guard member terminating above the conduit in a sharpened edge to engage the knee of the animal in the act of making the advance step.

The invention, in the preferred details of construction, will be described in the following specification, reference being had particularly to the accompanying drawings, in which:

Figure 1 is a plan view representing the application of our improved cattle guard.
Fig. 2 is an edge view of the same.

Referring particularly to the drawings, our improved cattle guard comprises a central guard member 1 and end guard members 2 and 3. The end members, of which there may be any desired number are of duplicate construction, and, as will be noted in Fig. 2 disposed in relative reverse directions from and with relation to the central member 1. The central member comprises a metallic strip practically coextensive in length with the length of the tie 4 which strip is bent into approximately inverted V-shape having the side edges 5 arranged at an approximate right angle to each other. The terminal edges of the sides 5 of the member 1 are projected outwardly relative to said member to provide flanges 6, which flanges are adapted to engage the knee of the animal in the attempt to make a forward step, as will later appear. The end members which are of identical construction, are also formed with metallic strips coextensive in length with the length of the tie and formed into inverted V-shape with the sides edges 7 disposed at an approximate right angle to each other. One of said edges terminates in a flange 8 corresponding to the flange 6 of the central member, while the opposing edge is projected below the plane of the flange and then extended downwardly at a relatively inward incline to provide a wall 9, then outwardly as at 10 into parallel relation with the flange 8 but in an opposing direction relative thereto, the outer edge of the wall 10 being outwardly and upwardly projected to provide a forward wall 11. The walls 9, 10 and 11 constitute the foot-receiving conduit of the end members, and as will be noted in Fig. 2, this conduit is disposed wholly below the plane of the flange 8.

The respective members are applied to the ties 4, as shown, the ties being arranged on edge so that the apex of each member constitutes the uppermost point of the same, providing an edge to receive the foot of the animal by which the animal is prevented from traveling along the guard without directing the feet down one side or the other of the members. The central member 1 is applied to the central tie of the section to be protected, and the respective end members 2 and 3 are secured in succession to the ties arranged in opposite directions beyond the ties covered by the central member. The respective end members are also arranged in opposition to each other, for example, the end members 2 will have their conduits projected toward the central member, while the end members 3 will have their conduits also projected toward the central member, that is, toward the conduits of the members 2. In this position of the parts, each end member of the series 2 and 3 immediately adjacent the central member will have its conduit directly underlying the flange 6 of the central member, while the conduit of each member of each series will have its conduit directly underlying the flange 8 of that member adjacent the particular end member in a direction toward the central member. With the members thus arranged, it is to be noted that the rear wall 9 of each conduit inclines from its upper end to its lower end in a direction away from the adjacent edge flange, and that this inclination causes the upper portions of the wall 9 to overhang the lower portion thereof. A pocket, hereinafter termed a heel pocket, is thus provided, and it is by virtue of this pocket in connection with the adjacent edge flange that the animal is prevented from making a step in advance. In the attempt of the animal to move lengthwise the guard from either end, the foot will find its way into the conduit, and as the leg is bent in an attempt to make the advance step, the heel of the foot will be caught in the heel pocket while the leg adjacent the knee will be brought into contact with the overlying edge flange. It is therefore, practically impossible for the animal to elevate its foot from the conduit for the advance step, and, hence, the rearward move of the animal is imperative, it being understood that there is nothing in the construction to prevent the direct upward movement of the foot of the animal incident to such rearward movement.

The respective members are preferably constructed of sheet metal of appropriate thickness, and galvanized or otherwise treated to prevent deterioration. The respective members may be secured to the ties in any desired manner.

Having thus described the invention what is claimed as new, is:—

1. A cattle guard including a guard member of inverted V-shape, the terminal portion of one side of the member being bent outwardly to provide a flange, the terminal portion of the other side of the member being projected to form a conduit including a bottom wall, a front wall, and a rear wall, the rear wall being inclined downwardly and inwardly relative to the member.

2. A cattle guard including a guard member formed to provide a conduit to receive the foot of the animal, the rear wall of the conduit inclining throughout its length to arrange the lower edge thereof rearwardly beyond the upper edge with relation to the member to form a heel pocket.

3. A cattle guard including a central guard member having oppositely projecting edge flanges, and end guard members arranged respectively on opposite sides of the central member, each of said end members being formed to provide an edge flange and a conduit having its rear wall inclined rearwardly from top to bottom to form a heel pocket.

4. A cattle guard including a central guard member having oppositely projecting edge flanges, and end guard members arranged respectively on opposite sides of the central member, each of said end members being formed to provide an edge flange and a conduit having its rear wall inclined rearwardly from top to bottom to form a heel pocket, the end members adjacent and on opposite sides of the central member being arranged with their foot conduits beneath the flanges of the central member, each remaining end member being arranged with its conduit beneath the flange of the end member adjacent thereto toward the central member.

In testimony whereof we affix our signatures in presence of two witnesses.

DAVID A. SIMS.
WALTER M. BROWN.

Witnesses:
 EDWD. CARUTHERS,
 JAMES PEARSON.